(12) United States Patent
Master et al.

(10) Patent No.: US 11,474,961 B2
(45) Date of Patent: Oct. 18, 2022

(54) REDUCING RUNTIME LOAD FOR VEHICLE SYSTEM DATA ENCRYPTION USING CRYPTO ENGINE WITH DIRECT MEMORY ACCESS (DMA)

(71) Applicant: Robert Bosch GmbH, Stuttgart (DE)

(72) Inventors: Gani Master, Detroit, MI (US); Matthias Ochs, Plymouth, MI (US); Khaled Sharaf, Canton, MI (US)

(73) Assignee: Robert Bosch GMBH, Stuttgart (DE)

( * ) Notice: Subject to any disclaimer, the term of this patent is extended or adjusted under 35 U.S.C. 154(b) by 0 days.

(21) Appl. No.: 17/251,021

(22) PCT Filed: Jun. 14, 2019

(86) PCT No.: PCT/EP2019/065752
§ 371 (c)(1),
(2) Date: Dec. 10, 2020

(87) PCT Pub. No.: WO2020/015940
PCT Pub. Date: Jan. 23, 2020

(65) Prior Publication Data
US 2021/0248097 A1  Aug. 12, 2021

Related U.S. Application Data

(60) Provisional application No. 62/700,502, filed on Jul. 19, 2018.

(51) Int. Cl.
*G06F 13/28* (2006.01)
*G06F 13/42* (2006.01)
*G06F 21/64* (2013.01)

(52) U.S. Cl.
CPC .......... *G06F 13/28* (2013.01); *G06F 13/4282* (2013.01); *G06F 21/64* (2013.01); *G06F 2213/28* (2013.01)

(58) Field of Classification Search
CPC ..................................................... G06F 21/64
See application file for complete search history.

(56) References Cited

U.S. PATENT DOCUMENTS 8,850,225 B2    9/2014  Noehring et al.
2002/0188839 A1 12/2002  Noehring et al.
(Continued)

OTHER PUBLICATIONS

International Search Report and Written Opinion for Application No. PCT/EP2019/065752 dated Aug. 16, 2019 (11 pages).
(Continued)

*Primary Examiner* — Henry Tsai
*Assistant Examiner* — Juanito Borromeo
(74) *Attorney, Agent, or Firm* — Michael Best & Friedrich LLP (57) ABSTRACT

Systems and methods are presented for secured communications in a controller area network for a vehicle system. A first electronic processor is communicatively coupled to a memory and configured to operate one or more vehicle systems. A second electronic processor is configured to generate message authentication codes to verify data communications between the first electronic processor and at least one other vehicle system controller in the controller area network. The direct memory access (DMA) module is configured to facilitate direct communications between the second electronic processor and the memory so that the first electronic processor can continue to execute other instructions while message authentication codes are generated by the second electronic processor for incoming and outgoing message data.

15 Claims, 3 Drawing Sheets

(56) References Cited

U.S. PATENT DOCUMENTS

2016/0330032 A1* 11/2016 Naim .................. G06F 13/4282
2017/0302441 A1* 10/2017 Temple .................. H04L 9/004
2018/0227282 A1*  8/2018 Lee .................. H04W 12/0431

OTHER PUBLICATIONS

Soja, "Automotive Security: From Standards to Implementation", Automotive Microcontrollers and Processors, NXP White Paper, Jan. 2014 (18 pages).

* cited by examiner

REDUCING RUNTIME LOAD FOR VEHICLE SYSTEM DATA ENCRYPTION USING CRYPTO ENGINE WITH DIRECT MEMORY ACCESS (DMA)

RELATED APPLICATIONS

This application claims the benefit of U.S. Provisional Application No. 62/700,502, filed Jul. 19, 2018, entitled "REDUCING RUNTIME LOAD FOR VEHICLE SYSTEM DATA ENCRYPTION USING CRYPTO ENGINE WITH DIRECT MEMORY ACCESS (DMA)," the entire contents of which are incorporated herein by reference.

BACKGROUND

The present invention relates to systems and methods for securing communications in a vehicle network including, for example, a plurality of vehicle devices communicatively coupled via a controller-area network (CAN) bus.

SUMMARY

In some embodiments, the invention provides system and methods for facilitating secure communications over a vehicle CAN bus with a reduced runtime load on the central processing unit (CPU) and/or the electronic control unit (ECU). This gives the central processor unit an opportunity to perform other tasks without waiting for the dedicated crypto hardware module to finish its operations. In some embodiments, a direct memory access (DMA) module is communicatively coupled to the crypto hardware module and configured to provide data transfer between the crypto hardware module and a memory module (e.g., a system RAM).

In one embodiment, the invention provides a system for secure vehicle communication with a DMA module configured to handle data transfer between a crypto hardware module—such as, for example a Secure Hardware Extension (SHE) module—and a memory module (e.g., a RAM). When the crypto hardware module completes a task of generating and/or validating a message authentication code (MAC), it triggers an input/output request that is sent to the DMA module. The DMA module is configured to move the data from the crypto hardware module to the appropriate location in the RAM in response to the input/output request from the crypto hardware module.

In another embodiment, the invention provides a system for facilitating secured communications in a controller area network for a vehicle system. The system includes a non-transitory computer-readable memory, a first electronic processor, a second electronic processor, and a direct memory access (DMA) module. The first electronic processor is communicatively coupled to the memory and configured to operate one or more vehicle systems. The second electronic processor is configured to generate message authentication codes to verify data communications between the first electronic processor and at least one other vehicle system controller in the controller area network. The direct memory access (DMA) module is configured to facilitate communications between the second electronic processor and the memory. The DMA module is further configured to access message data stored on the memory and to transmit the accessed message data to the second electronic processor. The second electronic processor is configured to generate a first message authentication code based on the message data received from the DMA module and to transmit the generated first message authentication code to the DMA module for storage on the memory.

In some embodiments, the message data is stored to the memory by the first electronic processor and intended to be transmitted to another device on the controller area network. After the message authentication code is generated by the second electronic processor, the message data and the generated message authentication code are both transmitted to the other device via the controller area network so that the receiving device can use the message authentication code to verify the authenticity/security of the message data.

In some embodiments, the message data is stored to the memory along with a received message authentication code that are both received via the controller area network from another device. After a new message authentication code is generated by the second electronic processor based on the received message data, the generated message authentication code is compared to the received message authentication code and the received message data is processed by the first electronic processor only after confirming that the generated message authentication code matches the received message authentication code.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

When electronic control units (ECUs) were introduced in the automotive sector, developers saw the need to share vehicle information (e.g., vehicle speed, engine RPM, etc.) with other ECUs in a vehicle and controller-area network (CAN) buses were adopted to share information between vehicle systems. This enabled all OEMs to add new features in each ECU and to fine tune the vehicle with greater speed and less complexity as the vehicle information/variables were available by all vehicle system ECUs on the vehicle CAN bus. However, unauthorized access of vehicle systems through unsecured CAN buses became a problem when unauthorized users/systems were able to access vehicle systems through internet-enabled devices such as, for example, a vehicle's infotainment system. In some cases, once access to the infotainment system is achieved, the unauthorized user/system is able to send false/incorrect vehicle information on the CAN bus, which made other ECUs react incorrectly.

One approach to providing secured communication on the vehicle network is to configure the system to send a message authentication code (MAC) with each message being sent on the CAN bus. In some implementations, an algorithm is defined to calculate the MAC based, for example, on the content of the message itself.

Figure 1:
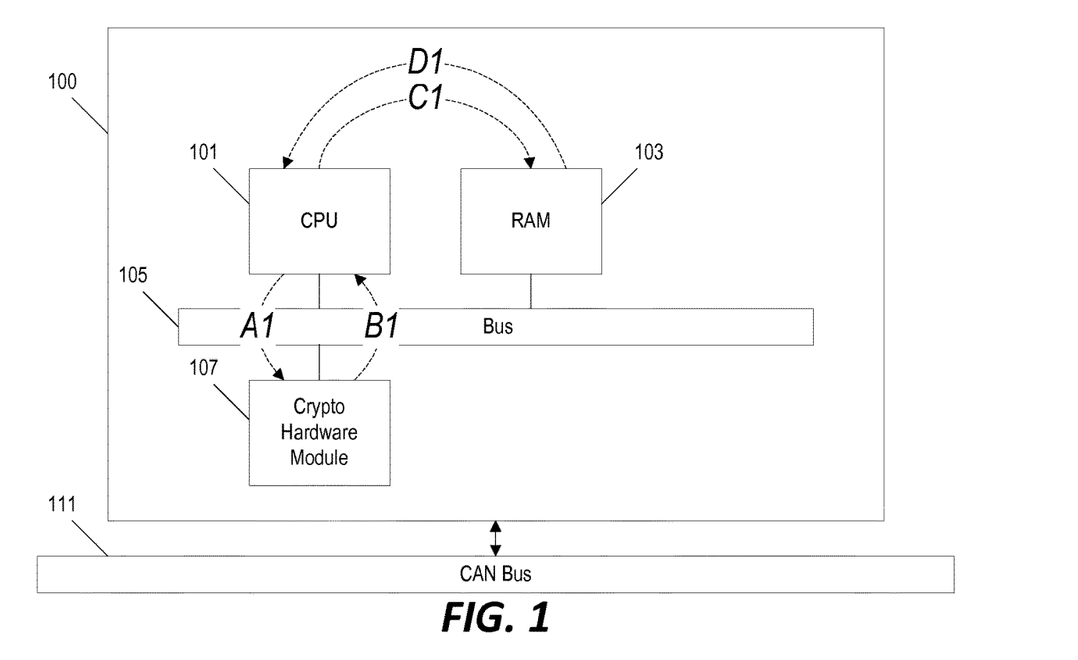
FIG. 1 is a block diagram of an example of a system for secure vehicle communications without direct memory access for the crypto hardware module of a microcontroller.

FIG. 1 illustrates an example of a vehicle communications system including a microcontroller 100 communicatively coupled to a CAN bus 111. The microcontroller 100 includes a CPU 101 and a non-transitory, computer-readable memory module (i.e., RAM 103) coupled to an internal bus 105 (e.g., a "peripheral bus" or "p-bus"). The microcontroller 100 also includes a crypto hardware module 107 that is also communicatively coupled to the peripheral bus 105. The crypto hardware module 107 is a hardware-implemented device including, for example, an electronic processor that is specifically configured to provide encryption and security functionality for data transmissions. In several of the examples discussed below, the crypto hardware module 107 is provided as a secure hardware extension (SHE) module. However, other types of crypto hardware modules may be possible in other implementations.

The SHE module 107 is a dedicated module that is used to calculate the MAC for each message that needs to be sent from the microcontroller 100 on the vehicle network. The process of calculating a MAC using a SHE module can be a time consuming function—in some implementations, the SHE module 107 runs an algorithm for a number of iterations to calculate a MAC.

The system of FIG. 1 can be configured to generate a MAC by a synchronous SHE call or by an asynchronous SHE call. When configured to use a synchronous SHE call, the CPU 101 orders the SHE module 107 to start generating/verifying a code for a message and provides an identified key slot (transmission A1 in FIG. 1). The CPU 101 then waits for the SHE module 107 to complete the MAC generation process and return a generated MAC (B1). The CPU 101 then stores the generated MAC to the RAM 103 (C1) for future use by another software component (D1). The advantage of using a synchronous SHE call in this way is that the software can generate/verify a large amount of MACs. However, in order to generate/verify a large number of MACs, the CPU 101 will be halted while it waits for the SHE module 107 to finish its calculations, which will adversely affect the CPU runtime load.

When using an asynchronous SHE call, the CPU 101 orders the SHE module 107 to start generating/verifying the code for a message and provides an identified key slot (A1). The CPU 101 is then able to continue performing other tasks and, after a certain amount of time, the CPU 101 checks to see if the SHE module 107 is finished generating the MAC. When the SHE module 107 is finished, the CPU 101 sends the next message to the SHE module 107 to generate another code. The advantage of an asynchronous SHE call scheme is that there will be a lower CPU load as the CPU 101 does not need to wait for the SHE module 107 each time a MAC is requested. However, there will be a limitation to the number of messages that the software can generate/verify.

Figure 2:
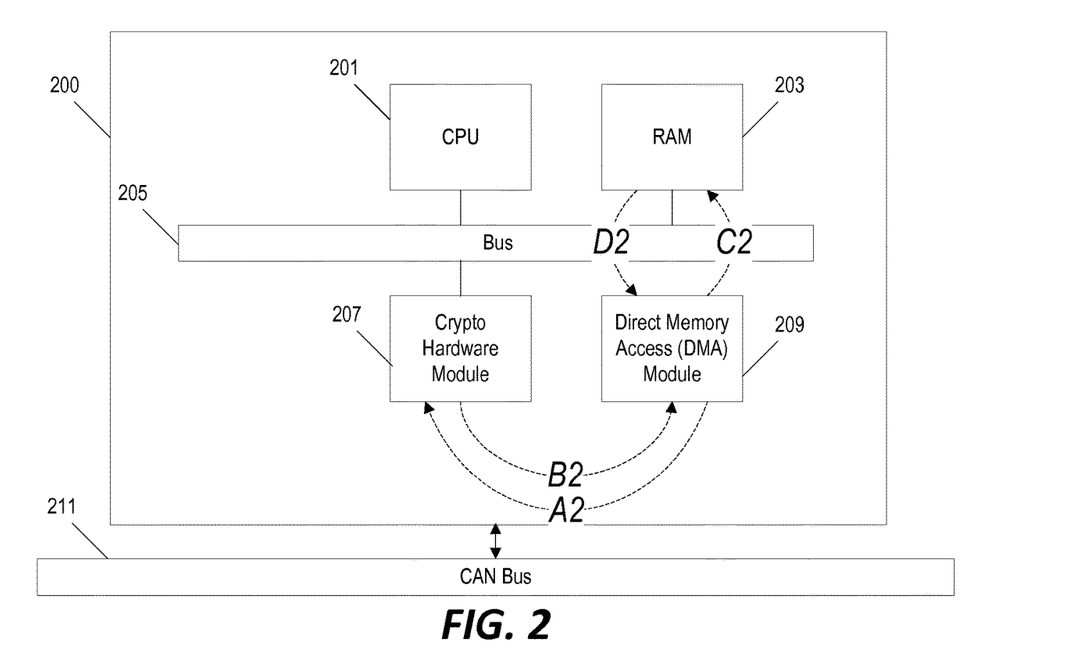
FIG. 2 is a block diagram of an example of a system for secure vehicle communication with a direct memory access module for the crypto hardware module for a microcontroller.

FIG. 2 illustrates another example of a system for facilitating secure vehicle communications that provides both the ability to generate/verify a large number of MACs and reducing the CPU runtime load. The system of FIG. 2 again includes a microcontroller 200 communicatively coupled to a CAN bus 211. The microcontroller 200 includes a CPU 201 and a non-transitory, computer-readable memory module (e.g., RAM 203) communicatively coupled to an internal peripheral bus 205 and a SHE module 207 also coupled to the peripheral bus 205. However, unlike the example of FIG. 1, the microcontroller 200 of FIG. 2 also includes a direct memory access (DMA) module 209. In the system of FIG. 2, the SHE module 207 generates and transmits direct memory access requests for both input and output requests. The DMA module 209 is configured to move the data between the SHE module 207 and the RAM 203 in response to DMA requests.

For example, the DMA module 209 can be configured to transmit the message/input data to the SHE module 207 (A2). When the SHE module 207 has completed generating a new MAC, the new MAC is transferred from the SHE module 207 to the DMA module 209 (B2). The DMA module 209 then stores the new MAC to the RAM 203 (C2) and, in some implementations, the DMA module 209 can be configured to directly access the MAC from the RAM 203 (D2) for use by another software component (e.g., transmission via the CAN bus). In some implementations, the DMA module 209 may also be configured to access directly from the RAM 203 the message/input data that will be used by the SHE module to generate the new MAC.

By using the DMA module 209, the CPU 201 does not need to be halted to wait for the SHE module 207 to finish generating a new MAC and does not need to move data from one location to another. Furthermore, in some implementations, the SHE module 207 and the DMA module 209 are configured to automatically generate or verify MACs for the next message without any intervention from the CPU 201.

Figure 3:
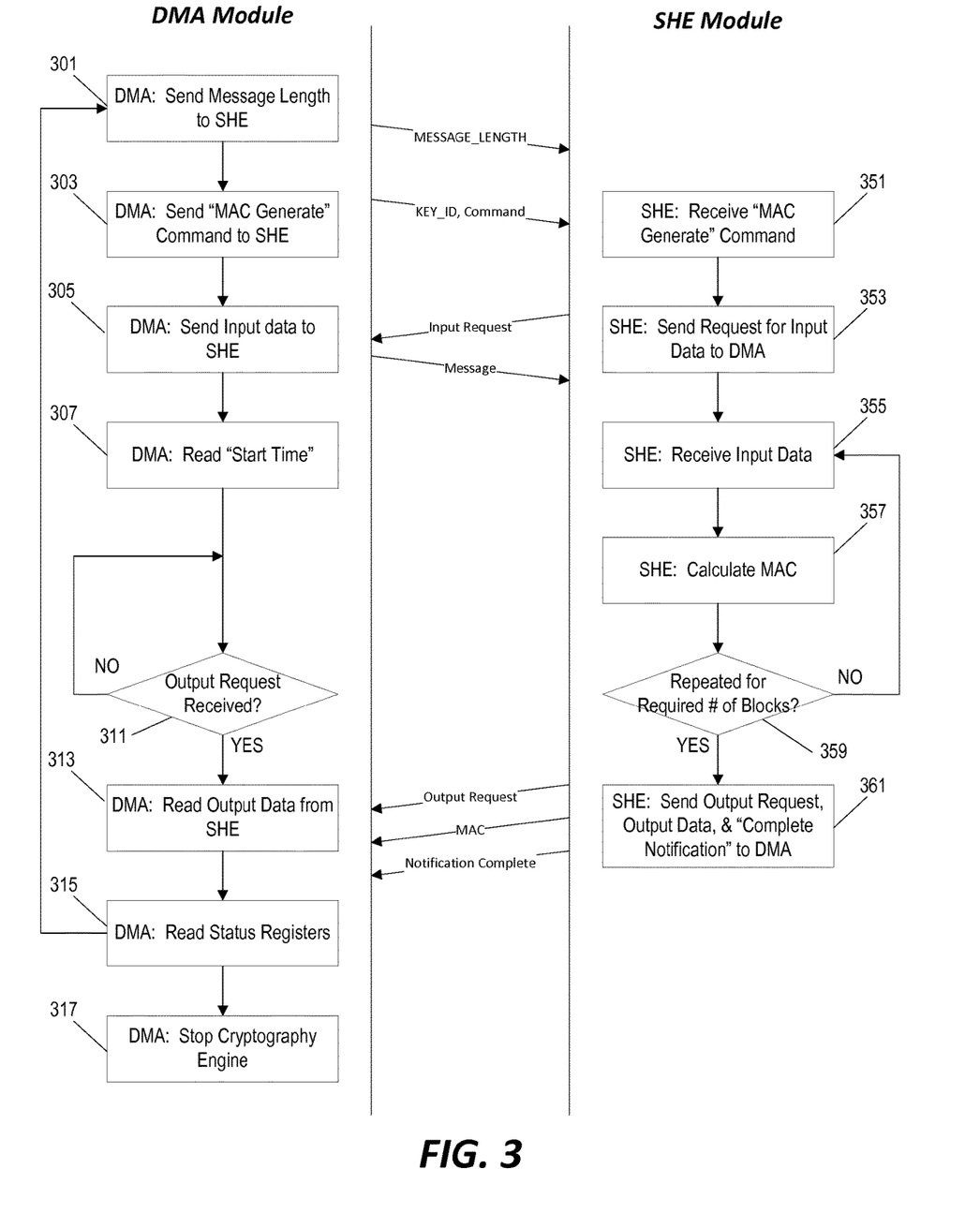
FIG. 3 is a flowchart of a method for generating a new message authentication code for secure vehicle communication using the system of FIG. 2.

FIG. 3 illustrates an example of a method implemented by the system of FIG. 2 for generating a MAC. The DMA module in this example is configured to execute a series of functions in a "chain configuration" sequence such that completion of one function triggers the execution of another function of the DMA module. In order to generate a MAC for a new message, the message length "N" (i.e., the bit length of the message) is sent to the SHE module (step 301). This is used for sending the 4×N requests from the SHE to the DMA to obtain data. The DMA_1 function of the DMA module is configured to then move the commands with the correct "KEY_SLOT" (or "KEY ID") to the command register of the SHE module (step 303). As soon as the SHE module receives the command (step 351), it triggers the DMA_2 input request (step 353). The DMA_2 function is configured to obtain the correct data and to trigger the DMA_3 function to start. This is called a chain configuration as one DMA function is configured to trigger another DMA function as it finishes.

When the DMA_2 function is finished, it triggers DMA_3 to start transferring the input data (i.e., the message) to the SHE module (step 305). After DMA_3 is finished (i.e., after the DMA module has transferred the input data to the SHE module), it triggers a DMA_4 function that accesses the start time from a hardware timer in a configurable resolution (step 307). The DMA module will move the value from the hardware timer to the RAM. At this point, the DMA module software does not need to do anything except to wait for the SHE module to send a DMA_5 output request when it is finished calculating the MAC.

After the SHE module receives the "message" from the DMA module (step 355), it uses the message itself to calculate the correct MAC (step 357) and repeats these steps for a required number of blocks (step 359). Once the SHE module is finished generating the MAC based on the data received from the DMA module, the SHE module will send an output request, the output data (i.e., the newly generated MAC), and a "Complete" notification to the DMA (step 361).

The DMA 5 output request is a hardware DMA-SHE request that is triggered when the SHE module finishes generating the MAC. When the output request is received by the DMA module (step 311), the DMA_5 function triggered by the output request causes the DMA module to read the output data from the output register of the SHE module (step 313) and to transfer 32-bits of the MAC output at a time from the register to the RAM.

When the DMA module finishes transferring the MAC output from the SHE module, the completion of the DMA_5 function triggers the DMA_6 function which reads a series of status registers to the RAM consecutively after each other (step 315). In this example, the status registers include a hardware status register which indicates the status of the crypto hardware module, an error register which indicates whether command execution has caused an error, a request flags register which indicates a request for data input and a request for data output, and an enable status register.

When the DMA_6 function is finished, it triggers the DMA_1 function to loop through all messages without any interference from the CPU. After performing a certain number of loops of these steps, the DMA_7 function is triggered to stop the cryptography engine (step 317). This step allows the software to control the engine and, specifically, to know/control how many messages for which the engine has generated or verified MACs.

Figure 4:
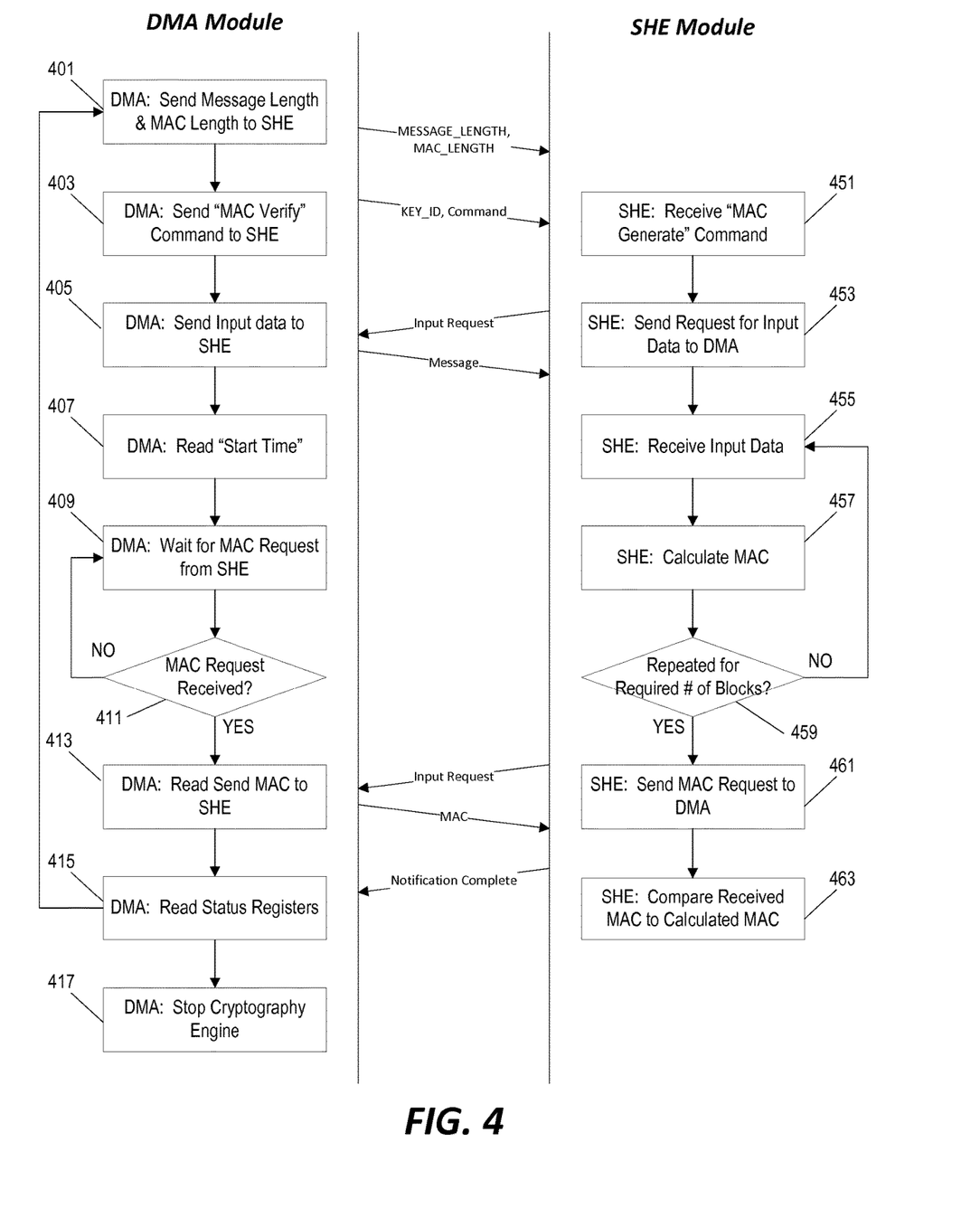
FIG. 4 is a flowchart of a method for validating a message authentication code for secure vehicle communication using the system of FIG. 2.

In addition to generating new MACs for secured communications, the system of FIG. 2 can also be configured to verify MACs. FIG. 4 illustrates an example of a method for verifying a MAC using the system of FIG. 2. In order to verify a MAC, the message length (i.e., the bit length of the message) and the MAC length (i.e., the bit length of the MAC) are both sent from the DMA module to the SHE module (step 401). The message length is used by the SHE module for sending 4×N requests from the SHE module to the DMA to obtain data from the RAM. The MAC length is used to verify the specified bits of the MAC. The DMA module then moves the commands with the correct KEY_SLOT to the command register of the SHE module (step 403). As soon as the SHE module receives the "generate MAC" command (step 451), it triggers a hardware DMA_2 input request (i.e., a request for input data from the DMA module) (step 453). In response to the DMA_2 input request, the DMA module obtains the message data from the RAM and then triggers the DMA_3 function which transfers the needed input data to the SHE module (step 405). In this example, the SHE module receives the input data (i.e., the message data) (step 455), uses the message to calculate the correct MAC internally in the SHE (step 457), and, if necessary, repeats these steps for a required number of blocks (step 459).

Once the DMA module is finished transferring the message data to the SHE module, the completion of the DMA 3 function triggers the DMA 4 function to start transferring the start time from a dedicated hardware timer (step 407). Again, in this example, the resolution for this timer is 1 μsec. The DMA module will then move the value from the hardware timer to the RAM and will wait for the SHE module to send a DMA 5 input request (i.e., a request for a previously generated MAC for the same data) when it is finished with the MAC calculation (step 409).

Once the SHE module has completed calculation of the MAC based on the message, it sends a DMA_5 request to the DMA module instructing the system to access the MAC value for the message from the RAM (step 461) so that the actual MAC value can be compared with the generated MAC value. In some implementations (as illustrated in the example of FIG. 4), the DMA module sends the MAC value to the SHE module (step 413) which then compares the received MAC value to its generated MAC value (step 463). However, in other implementations, the DMA module might be configured to transfer the newly calculated MAC value from the SHE module to RAM and to trigger another module—such as, for example, the CPU—to compare the actual MAC value to the generated MAC value to verify the message.

The DMA module then reads a series of four status registers from the SHE module to the RAM (step 415). The four registers in this example includes: a hardware status register which indicates the status of the crypto hardware module, an error register which indicates whether command execution has caused an error, a request flags register which indicates a request for data input and a request for data output from the crypto hardware module, and an enable status register which indicates whether the crypto hardware module is enabled or disabled. In implementations where the SHE module is configured to compare the actual MAC for the message to the newly generated MAC, the SHE module may also be configured to indicate whether the message was properly verified (i.e., the actual MAC and the newly generated MAC match) through one or more of the status registers.

When the DMA_6 function is finished, it triggers the DMA_1 function to loop through all messages without any interference from the CPU. Again, after performing a certain number of loops of these steps, the DMA_7 function causes the DMA module to stop the cryptography engine (step 417). By stopping the cryptography engine in this way, the software of the DMA module is able to control the engine and, specifically, control/monitor the number of messages that the engine processed for MAC generation and/or MAC verification.

In some implementations, the cyclic function of the system would be configured to calculate the time duration for each MAC Generate/Verify process using the following equation:

Duration [Current Command]=Start Time [Next Command]−Start Time [Current Command]

The time duration is used to check whether a certain command took more than the specified time for the crypto hardware module limitations.

The SHE module can also be configured to perform a "Build in Self-Test" (BIST) with a configurable cycle time (e.g., every 1 mSec) without any CPU intervention by executing the following commands in succession:

GENERATE_MAC: During the first millisecond, the Engine would write a test Key in the KEY_RAM slot and write a test message to the input register to generate a MAC. Afterwards, the Engine would check the calculated MAC (in the cyclic function) to verify that it is the same as the one that is calculated offline.

VERIFY_MAC_POSITIVE (Positive Test): During the second millisecond, the Engine would write the Offline Key to the TestKey 32-bit register, the Offline Message to the TestMessage 32-bit register, and the Offline Calculated MAC to the TestMAC 32-bit register. Afterwards, the engine checks whether the SHE module has successfully verified the message using the VERIFY_MAC_POSITIVE.

GENERATE_MAC: During the third millisecond, the engine would write a test Key in the KEY_RAM slot command and will write a test message to the input register to generate a MAC. Afterwards, the engine will check the calculated MAC (in the cyclic function) to confirm whether it is the same as the MAC that is calculated offline.

VERIFY_MAC_NEGATIVE (Negative Test): During the fourth millisecond, the engine would write the Offline Key to the TestKey 32-bit register, the offline message to the TestMessage 32-bit register, and the offline calculated MAC with negating 1 bit to the TestMAC 32-bit register. Afterward, the engine will check whether the SHE has successfully unverified the message using the VERIFY_MAC_NEGATIVE command.

GENERATE_MAC: During the fifth millisecond, the engine will write a test key in the KEY_RAM slot and will write a test message to the input register to generate a MAC. Afterwards, the engine will check the calculated MAC (in the cyclic function) to confirm whether it is the same as the one that is calculated offline.

VERIFY_MAC_POSITIVE (Positive Test): During the sixth millisecond, the engine will write a test key in the KEY_RAM slot and will write both a test message and a MAC to the input register to verify the MAC. Afterwards, the engine will check the status registers (in the cyclic function) to check whether the SHE successfully verified the MAC.

GENERATE_MAC: During the seventh millisecond, the engine will write a test key in the KEY_RAM slot and will write a test message to the input register to generate a MAC. Afterwards, the engine will check the calculated MAC (in the cyclic function) to confirm whether it is the same as the one that is calculated offline.

VERIFY_MAC_NEGATIVE (Negative Test): During the eighth millisecond, the engine will write a test key in the KEY_RAM slot and will write both a test message and a MAC (negating 1 bit) to the input register to verify the MAC. Afterwards, the engine will check the status registers (in the cyclic function) to confirm that the SHE module successfully unverified the MAC.

In this implementation, a cyclic function of the cryptography engine is the only function that is processed by the CPU (relating to the generation and verification of MACs). The cyclic function includes:

1. Performing start up checks on the SHE
2. Initializing the SHE random number generator
3. Preparing the correct input bulk data for the DMA from the RAM
4. Reading the generated bulk data and moving them to a safe location in the RAM
5. Calculating the time duration for each command and checking timeouts
6. Checking the cyclic build in self-test (BIST)
7. Resetting the DMA configuration for the next N bulk messages.

The cyclic function is also configured to check the duration for each command being sent, perform the cyclic build in self-test (BIST), move the data from the DMA RAM to the normal RAM section, and reconfigure the DMA to start the bulk buffer from the beginning In order to calculate the maximum number of messages that a crypto engine can cyclically perform, the following equations may be used:

$$\text{Number of Messages for Generation} = \frac{\text{Cycle Time}}{\text{Max}(MAC \text{ Generate duration})} \times \text{Safety Percentage}$$

$$\text{Number of Messages for Verification} = \frac{\text{Cycle Time}}{\text{Max}(MAC \text{ Verification duration})} \times \text{Safety Percentage}$$

The "safety percentage" is a factor for the cryptography engine that limits the number of messages that the engine can perform (or else the engine might over write the next RAM slot as it is a fast automated process) and taking the DMA transfer time into consideration. In some implementations, the safety percentage is defined as 84%, but, in other implementations, the safety percentage can be adjusted and tuned for the purposes and nature of the specific implementation.

As the DMA is transferring data from the hardware SHE module to the RAM at a high frequency, in some implementations the data integrity of the RAM might also be protected by configuring the system so that only the CPU is allowed to read from a certain RAM block range.

The examples described above are only some of the possible implementations and other configurations and implementations are possible. For example, although the example illustrated in FIG. 2 provides a single microcontroller that includes a CPU, a crypto hardware module, a DMA module, and a RAM, in other implementations, these components and/or their described functions can be implemented across multiple controllers or as separate chip components. For example, the CPU, crypto hardware module, and/or the DMA module can each be implemented as a separate ECU/chip. Also, although in the examples above the crypto hardware module itself is configured to verify a MAC by comparing a newly calculated MAC to the MAC that was sent with the message, in other implementations, the crypto hardware module may be configured to calculate and output a new MAC and another component/module (e.g., the CPU) may be configured to access the newly generated MAC and compare it to the message MAC to complete the verification.

Thus, the invention provides, among other things, a system for secured vehicle communications using a crypto hardware module with direct memory access. Various features and advantages of the invention are set forth in the following claims.

What is claimed is:

1. A system for facilitating secured communications in a controller area network for a vehicle system, the system comprising:
 a non-transitory computer-readable memory;
 a first electronic processor configured to operate one or more vehicle systems and communicatively coupled to the memory, wherein the memory stores message data for each of a plurality of messages, wherein each message of the plurality of messages is either a generated message generated by the first electronic processor for transmission via the controller area network or a received message received by the first electronic processor via the controller area network;

a second electronic processor configured to generate message authentication codes to verify data communications between the first electronic processor and at least one other vehicle system controller in the controller area network; and a direct memory access (DMA) module configured to facilitate communications between the second electronic processor and the memory, wherein the direct memory access (DMA) module is configured to access message data for a first message stored on the memory and transmit the accessed message data for the first message to the second electronic processor, wherein the second electronic processor is configured to generate a first message authentication code based on the message data for the first message received from the direct memory access (DMA) module and to transmit the generated first message authentication code to the direct memory access (DMA) module, and wherein the direct memory access (DMA) module is further configured to access message data for a second message stored on the memory and transmit the accessed message data for the second message to the second electronic processor in response to receiving the generated first message authentication code from the second electronic processor.

2. The system of claim 1, wherein the direct memory access (DMA) module is further configured to receive the first message authentication code from the second electronic processor and to store the first message authentication code to the memory.

3. The system of claim 2, wherein the message data for the first message and the first message authentication code are transmitted to another vehicle system of the at least one other vehicle system controller via the controller area network.

4. The system of claim 1, wherein the system is configured to store to the memory, for each received message, received message data and a received message authentication code.

5. The system of claim 4, wherein the direct memory access (DMA) module is further configured to access the received message data for a first received message stored on the memory and to transmit the received message data for the first received message to the second electronic processor, and wherein the second electronic processor is configured to generate a second message authentication code based on the received message data for the first received message.

6. The system of claim 5, wherein the direct memory access (DMA) module is further configured to access the received message authentication code for the first received message from the memory and to transmit the received message authentication code for the first received message to the second electronic processor, and wherein the second electronic processor is configured to confirm that the received message data for the first received message is secure by comparing the second message authentication code generated by the second electronic processor to the received message authentication code for the first received message.

7. The system of claim 6, wherein the first electronic processor is configured to process the received message data for the first received message only after the second electronic processor has confirmed that the second message authentication code matches the received message authentication code for the first received message.

8. The system of claim 6, wherein the first electronic processor is configured to process the received message data for the first received message by operating the one or more vehicle systems based on the received message data for the first received message.

9. The system of claim 5, wherein the first electronic processor is configured to
receive the second message authentication code and the received message authentication code for the first received message,
compare the second message authentication code and the received message authentication code for the first received message, and
process the received message data for the first received message only after confirming that the received message authentication code for the first received message matches the second message authentication code.

10. The system of claim 1, further comprising a secure hardware extension module, wherein the secure hardware extension module includes the second electronic processor.

11. A method of facilitating secure data communication in a controller area network for a vehicle, the method comprising:
storing message data from a first electronic processor for each of a plurality of messages to a non-transitory computer readable memory, wherein each message of the plurality of messages is generated by the first electronic processor for transmission via the controller area network;
accessing, by a direct memory access (DMA) module, the stored message data for a first message of the plurality of messages from the memory;
transmitting the stored message data for the first message from the direct memory access (DMA) module to a second electronic processor;
generating, by the second electronic processor, a message authentication code for the first message based on the message data for the first message received from the direct memory access (DMA) module;
transmitting the generated message authentication code for the first message from the second electronic processor to the direct memory access (DMA) module;
storing, by the direct memory access (DMA) module, the message authentication code for the first message to the memory;
transmitting the stored message data and the stored message authentication code to another vehicle system controller via the controller area network; and
transmitting, by the direct memory access (DMA) module, the stored message data for a second message of the plurality of messages from the memory to the second electronic processor in response to receiving the generated message authentication code for the first message from the second electronic processor.

12. The method of claim 11, further comprising:
receiving message data for a first received message and a received message authentication code for the first received message from another vehicle system controller via the controller area network;
storing the message data for the first received message and the received message authentication code for the first received message to the memory, wherein storing the message data for the first received message and the received message authentication code for the first received message adds the first received message to the plurality of messages stored on the memory;

accessing, by the direct memory access (DMA) module the message data for the first received message from the memory;

transmitting the message data for the first received message from the direct memory access (DMA) module to the second electronic processor;

generating, by the second electronic processor, a second message authentication code based on the message data for the first received message received from the direct memory access (DMA) module; and processing, by the first electronic processor, the message data for the first received message only after confirming that the second message authentication code generated by the second electronic processor matches the received message authentication code for the first received message.

13. The method of claim 12, wherein processing, by the first electronic processor, the message data for the second message includes operating, by the first electronic processor, one or more vehicle systems based on the message data for the second message.

14. The method of claim 12, further comprising:

transmitting the received message authentication code for the first received message from the direct memory access (DMA) module to the second electronic processor; and comparing, by the second electronic processor, the received message authentication code for the first received message to the second message authentication code generated by the second electronic processor.

15. The method of claim 12, further comprising:

transmitting the second message authentication code from the second electronic processor to the direct memory access (DMA) module;

storing, by the direct memory access (DMA) module, the second message authentication code to the memory;

accessing, by the first electronic processor, the second message authentication code and the received message authentication code for the first received message from the memory; and comparing, by the first electronic process, the received message authentication code for the first received message to the second message authentication code generated by the second electronic processor.

\* \* \* \* \*